Patented Aug. 4, 1936

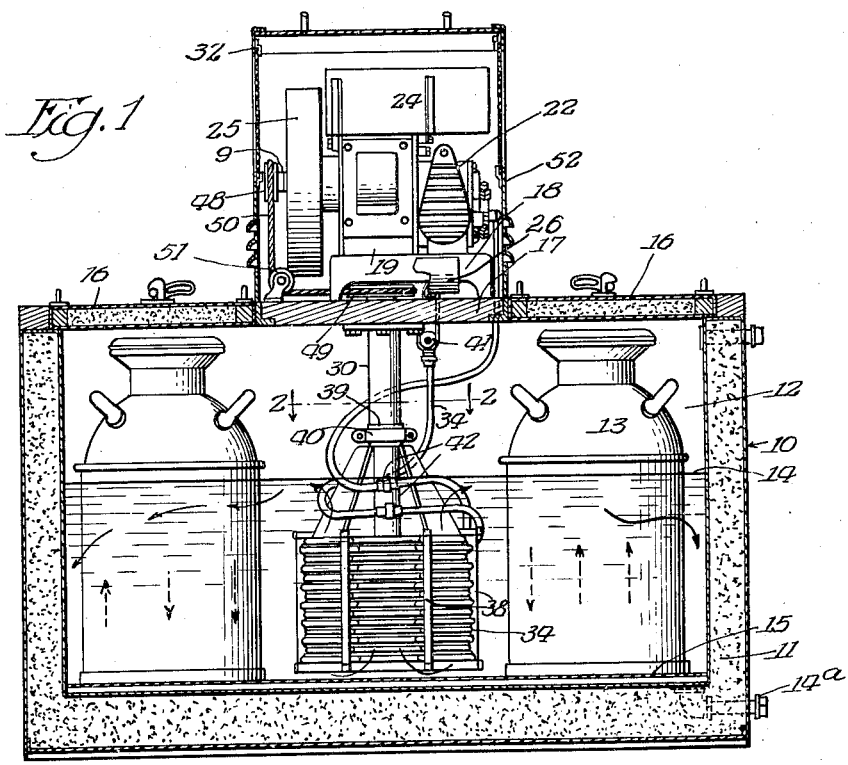

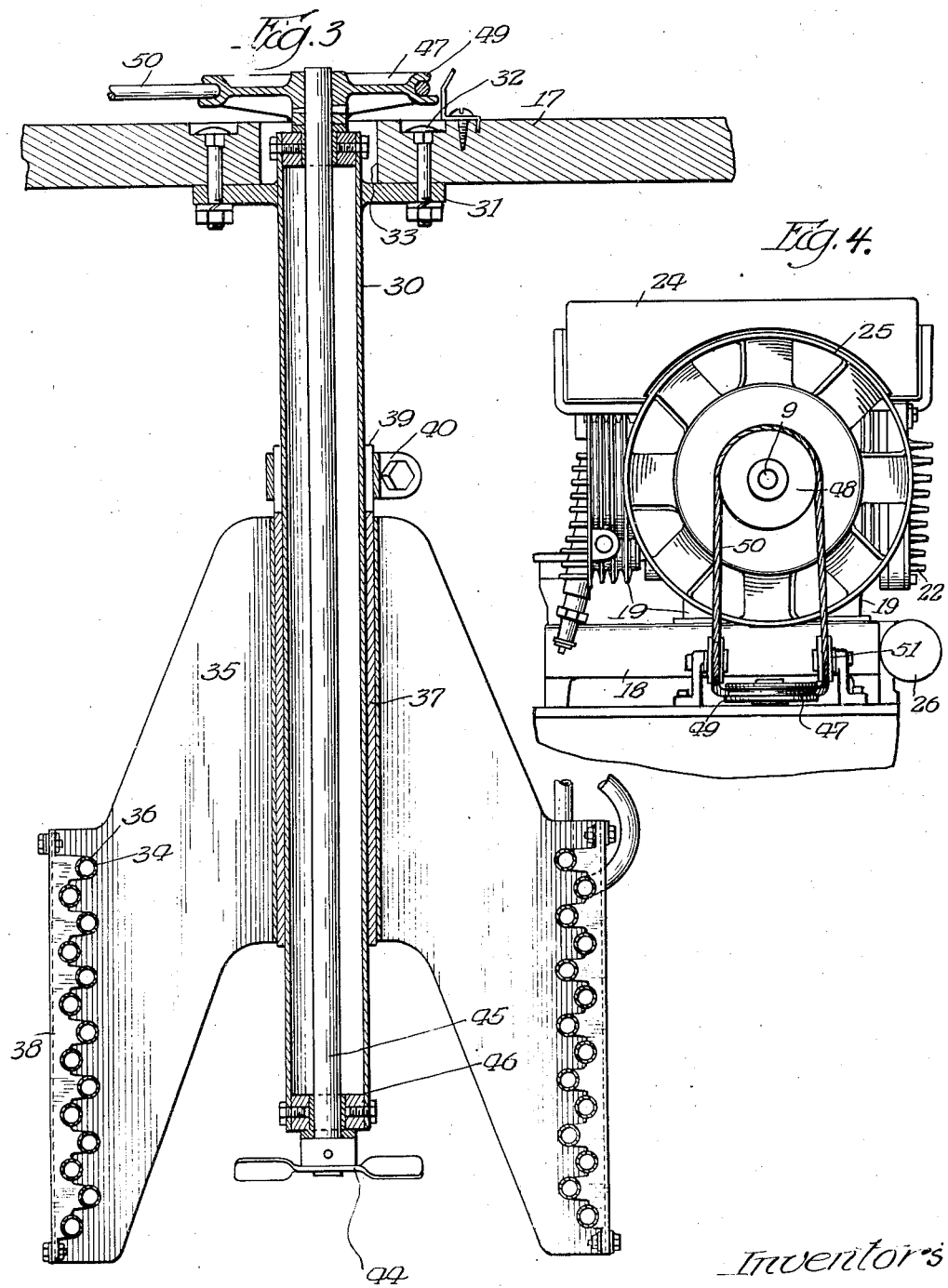

2,050,192

UNITED STATES PATENT OFFICE 2,050,192

MILK COOLER

Lee W. Melcher and James B. Fisher, Waukesha, Wis., assignors to Waukesha Motor Company, Waukesha, Wis.

Application April 23, 1934, Serial No. 721,894

8 Claims. (Cl. 62—101)

The invention relates to milk coolers.

One object of the invention is to provide a complete refrigerating apparatus including a motor, a compressor and an evaporating coil which may be completely manufactured and assembled at the factory for installation as a unit in connection with a cabinet for milk cans.

Another object of the invention is to provide a unit of the aforementioned character which permits of the adjustment of the evaporating coil for properly positioning it in cabinets or tanks of different heights.

A further object of the invention is to provide an improved milk cooler with an agitator driven from the motor of the refrigerating unit by which the water in which the cans are submerged is forced from the lower portion of the tank to the upper portion to cause the coolest portion of the water to flow around the evaporator and upwardly toward the top of the water column to contact with the upper portions of the cans containing the milk. By producing this upward flow of cooling water, it becomes effective on the milk in the upper portions of the cans where the warmest milk is disposed. As a result of this movement of the cooling water a downward current of the coolest milk is produced which causes circulation of the milk to maintain a substantially uniform temperature of all the milk in the can. This avoids over cooling one portion of the milk or under cooling another portion.

Another object of the invention is to provide a milk cooler containing an evaporating coil with means for rapidly circulating the water around the milk cans to produce the maximum absorption of heat from the coils and make it possible to use a minimum amount of evaporating coil.

Other objects of the invention will appear from the detailed description.

The invention consists in the several novel features hereinafter set forth and more particularly defined by claims at the conclusion hereof.

In the drawings:

Fig. 1 is a vertical section of a milk cooler embodying the invention;

Fig. 2 is a horizontal section on line 2—2 of Fig. 1;

Fig. 3 is a vertical section through the evaporating coil and its support; and—

Fig. 4 is an end view of the refrigerating unit illustrating the device for propelling the agitator for the water in the cooling tank.

The invention is exemplified in a cabinet 10, the sides and bottom of which are usually formed of double walls with an insulating filling 11 between them, as well understood in the art. The inner walls of the cabinet form a tank 12 adapted to hold any desired number of milk cans 13 and a column of water 14 in which the cans are submerged. A corrugated false bottom 15 fits on the bottom of the cabinet and the cans rest on the crests of the corrugations, so that the grooves between the crests will permit the water to circulate under the milk cans. Suitable covers 16 are removably clamped on the top of the cabinet 10 adjacent its ends and permit of access to the tank so that the milk cans may be placed into the tank and removed therefrom. The tank is usually provided with a suitable drain pipe 14ª through which the water may be drained from the tank 12 when desired.

A central top panel 17 extends between the covers 16 and closes the top of the cabinet between the covers. It serves as a support for the entire refrigerating apparatus including the compressor, the motor, the condenser, and the evaporating coil. The refrigerating apparatus comprises a base 18 on which is mounted the casing 19 of the motor. The latter is of the internal combustion type and comprises an integral crank-case and cylinder, and a crank-shaft 9 mounted in the crank-case. The compressor for the refrigerant comprises a casing 22, having an integral crank case and cylinder. The side of the compressor crank-case is secured to one side of the crank-case of the motor. The condenser for the high pressure refrigerant is designated by the reference numeral 24 and is mounted on top of the motor casing 19. The crank-shaft 9 of the motor extends to the outside of the crank-case 23 and carries a fly-wheel 25. A receiver 26 for the liquefied refrigerant is mounted on one end of the base 18. From the compressor, the refrigerant is delivered to the condenser 24 and from the condenser to the receiver 26, as well understood in the art. The particular construction of the refrigerating unit illustrated, and adapted for use with the present invention, is set forth in detail in an application filed by Lee W. Melcher and of even date herewith, Serial No. 728,229, to which reference may be had for the details of the construction of the refrigerating apparatus.

A vertical tubular support 30 is provided with lugs 31 which are secured by bolts 32 to the under side of panel 17. The upper end of this sleeve extends through an opening 33 in the panel 17. This sleeve serves as a support for the evaporating coil of the refrigerating apparatus and also serves as a support for the agitating device for the cooling water in the tank, as hereinafter set forth. The evaporating coil is designated by the reference numeral 34 and the loops thereof are held in notches 36 in sheet metal radial arms 35 which are formed in pairs and are riveted to a sleeve 37 around the tube 30. The loops of the evaporating coil are staggered and are held in the recesses 34 of the arms 35 by channel bars 38 which are bolted or otherwise suitably secured to flanges at the outer ends of the arms 35. The sleeve 37 is vertically slidable on the fixed supporting tube 30. The upper end of sleeve 37 is split, as at 39, and a clamp 40 is adapted fixedly to secure the sleeve 37 to the tube 30. This construction exemplifies an evaporating coil which is adapted to be adjusted to and from the top panel 17 which supports the refrigerating unit, to adapt the coil and unit for cabinets of different depths. The unit can be assembled at the factory and the evaporating coil can be adjusted vertically so it will be properly positioned in the lower portion of the cooling tank of the cabinet in which the unit is installed.

The high pressure side of the evaporating coil 34 is connected to an expansion valve 41, which is connected to the receiver 26, as well understood in the art. The other end of the evaporating coil is connected to the suction side of the compressor, as well understood in the art. The pipe connection between the evaporating coil and the expansion valve 41 of the compressor, respectively, are usually formed of flexible tubing and looped sufficiently to permit the evaporating coil to be raised and lowered in its vertical adjustment. Preferably union couplings 42 are included in these pipe connections.

The construction thus far described exemplifies one in which the complete refrigerating unit can be assembled at the factory on the panel 17 in readiness to be mounted on and installed in connection with a cabinet. Also one in which provision is made for vertically adjusting the evaporating coil to position it properly in cooling tanks of different heights.

The supporting tube 30, besides carrying the evaporating coil, serves as a support for an agitator for the water in the tank. This agitator comprises a propeller 44 which is secured to the lower end of a vertical shaft 45. The latter is mounted in a lower bearing 46 and an upper bearing 47 in the lower and upper ends of the tube 30, respectively. The propeller 44 is disposed within the lower portion of the evaporating coil and its blades are shaped to propel the water in which they are submerged upwardly in the tank around the tube 30 and between the arms 35. Normally, the coldest water lies adjacent the lower portion of the tank. By directing this cold water toward the top of the milk cans, it is brought in contact with the warmest milk in the can which is normally disposed adjacent the top of the can. This creates a maximum thermal movement of the milk within the can and causes the colder milk to descend in the can. By moving the water between and around the evaporating coils at a rapid speed the maximum absorption of heat results from a minimum amount of coil area.

Mechanism is provided for constantly driving the propeller 44 during the operation of the refrigerating unit. This mechanism comprises a pulley 48 fixed to the motor crank-shaft or fly-wheel 25, a pulley 49 keyed to the upper end of the shaft 45 which extends upwardly through and above the tube 30, a belt 50 trained around pulleys 48, 49, and intermediate guide pulleys 51 which are mounted in brackets on the top of the panel 17. This exemplifies mechanism for driving the propeller 44 from the shaft of an internal combustion motor during the operation of the compressor, which is mounted on the panel 17 to form a part of the unit assembly. A suitable sheet metal housing 52 having perforated ends is placed over the motor and compressor.

In operation, while the compressor is being operated the refrigerant from the evaporating coil will be continuously compressed, condensed and liquefied to cause it to circulate through the evaporating coil under low pressure, as well understood in the art. This will cause the column of water 14 in the tank 12 to be continuously cooled, with the coolest portion adjacent the lower portion of the tank. During the operation of the compressor, the propeller 44 will be continuously operated to circulate the water upwardly around the loops of, and within, the evaporating coil and into contact with the upper portions of the milk cans which contain the warmer portion of the milk. This cooling and circulation of water causes the milk to cool quickly and evenly. It dispenses with the necessity of stirring the milk. By directing the cold water toward the top of the can, it is brought in contact with the warmest milk in the can, thus creating a maximum thermal movement of the milk within the can. This even cooling and temperature results in better maintenance of the milk while shipping cans are in transit.

The invention is not to be understood as restricted to the details set forth, since these may be modified within the scope of the appended claims without departing from the spirit and scope of the invention.

Having thus described the invention, what we claim as new and desire to secure by Letters Patent is:

1. In a milk cooler, the combination of a tank for cooling liquid and adapted to contain milk cans, a panel on top of the tank, a refrigerating unit comprising a motor, a compressor, and a condenser mounted on the panel, an evaporating coil, a support secured on and extending downwardly from the panel on which the evaporating coil is mounted, a shaft extending vertically through the support, a propeller secured to the lower end of the shaft, and means for driving the shaft from the motor, comprising a pulley on the upper end of the shaft.

2. In a milk cooler, the combination of a tank for cooling liquid and adapted to contain milk cans, a panel on top of the tank, a refrigerating unit comprising a motor, a compressor, and a condenser mounted on the panel, an evaporating coil, a tubular support secured on and extending downwardly from the panel on which the evaporating coil is mounted, a shaft extending vertically through the tubular support, a propeller secured to the lower end of the shaft, and means for driving the shaft from the motor comprising a pulley on the upper end of the shaft.

3. In a milk cooler, the combination of a tank for cooling liquid and adapted to contain milk cans, a panel on top of the tank, a refrigerating unit comprising a motor, a compressor, and a condenser mounted on the panel, an evaporating coil, a support secured on and extending downwardly from the panel, a vertically adjustable connection for supporting the evaporating coil from said support, a shaft extending vertically through the support, a propeller secured to the lower end of the shaft, and means for driving the shaft from the motor, comprising a pulley on the upper end of the shaft.

4. In a milk cooler, the combination of a tank for cooling liquid and adapted to contain milk cans, a panel on top of the tank, a refrigerating unit comprising a motor, a compressor, and a condenser mounted on the panel, an evaporating coil, a tubular support secured on and extending downwardly from the panel, vertically adjustable means for supporting the coil from the tubular support, a shaft extending vertically through the tubular support, a propeller secured to the lower end of the shaft, and means for driving the shaft from the motor comprising a pulley on the upper end of the shaft.

5. In a milk cooler, the combination of a tank having a top and adapted to contain cooling liquid and milk cans immersed in the liquid, a refrigerating unit comprising a compressor and motor mounted on the top of the tank and an evaporating coil disposed beneath said top and connected to the compressor by a flexible connection, and means connected to and depending from the top of the tank for supporting the evaporating coil so that it is vertically adjustable with respect to the liquid in the tank.

6. In a milk cooler, the combination of a tank adapted to contain cooling liquid and milk cans to be cooled, an evaporating coil in the tank and supported from the top of the tank, a refrigerating unit including the coil and comprising a compressor and a motor mounted on the top of the tank, and a vertically extending support disposed in the tank and on which the evaporating coil is adjustably mounted.

7. A refrigerating unit for a tank cooler, comprising a panel adapted to fit on, and forming a part of, the top of the cooler, a refrigerating unit comprising a motor, a compressor and a condenser all mounted on the panel and also comprising an evaporating coil disposed under said panel, and means connected to and depending from the panel forming a support for the evaporating coil whereby the latter may be adjusted bodily to and from said panel.

8. In a milk cooler, the combination of a tank adapted to contain a column of cooling liquid and milk cans, a refrigerating unit comprising a motor and a compressor disposed outside of the tank and also comprising an evaporating coil disposed in the tank and submerged in the column of cooling liquid, a propeller for the cooling liquid mounted on a vertically extending shaft and adapted to propel the cooling liquid upwardly around the evaporating coil, means mounted on the top of the tank for driving the propeller, and means for supporting the evaporating coil so that it is adjustable vertically with respect to the propeller.

LEE W. MELCHER.
JAMES B. FISHER.